E. H. ASHCROFT, OF LYNN, MASSACHUSETTS.

Letters Patent No. 83,587, dated November 3, 1868.

IMPROVEMENT IN STEAM-ENGINE OIL-CUPS.

The Schedule referred to in these Letters Patent and making part of the same.

*To all whom it may concern:*

Be it known that I, E. H. ASHCROFT, of Lynn, in the county of Essex, and State of Massachusetts, have invented certain new and useful Improvements in Lubricators; and I hereby declare that the following is a full, clear, and exact description of the same, reference being had to the accompanying drawings, in which—

Figure 1 is an elevation, and

Figure 2, a section of an oil-cup, constructed in accordance with my invention.

In the ordinary oil-cups, tallow cannot be used as a lubricator, on account of the openings in the same being too small, except in a molten state.

The nature of my invention consists in the combination and arrangement of two metallic cups, one within the other, it being open at the top, and a valve being connected with its lower end by which to lubricate a steam-cylinder.

To enable others to make and use my invention, I shall now proceed to describe its construction and operation.

In the drawings—

A is a vessel to contain oil or tallow.

B is a rod, having bearings in the top of the said vessel, at the lower end of which is a valve, C.

D is a wheel for rotating the rod B, and opening or closing the orifice of vessel A.

E is a strainer for straining the oil or tallow.

F is a valve for admitting steam to melt the tallow.

The operation is as follows:

The valve F is opened and steam allowed to enter the space G, and melt the tallow in vessel A. When the tallow is melted, close valve F and open valve C, and the tallow will run into the chamber G. Valve C is then closed. By opening valve F, the tallow will enter the cylinder. The vessel A is open at the top, and the amount of oil in the same may thus readily be ascertained.

Having thus described my invention,

What I claim as new, and desire to secure by Letters Patent of the United States, is—

The combination and arrangement of the outer cup G, inner open-mouthed cup A, stem B, and valve C, operated in the manner as shown and described, and for the purpose set forth.

E. H. ASHCROFT.

Witnesses:
CHARLES E. ASHCROFT,
EDWIN J. WRIGHT.

C. SLOTTERBEK.
Fire Arm.
No. 84,224.
2 Sheets--Sheet 1.
Patented Nov. 17, 1868.
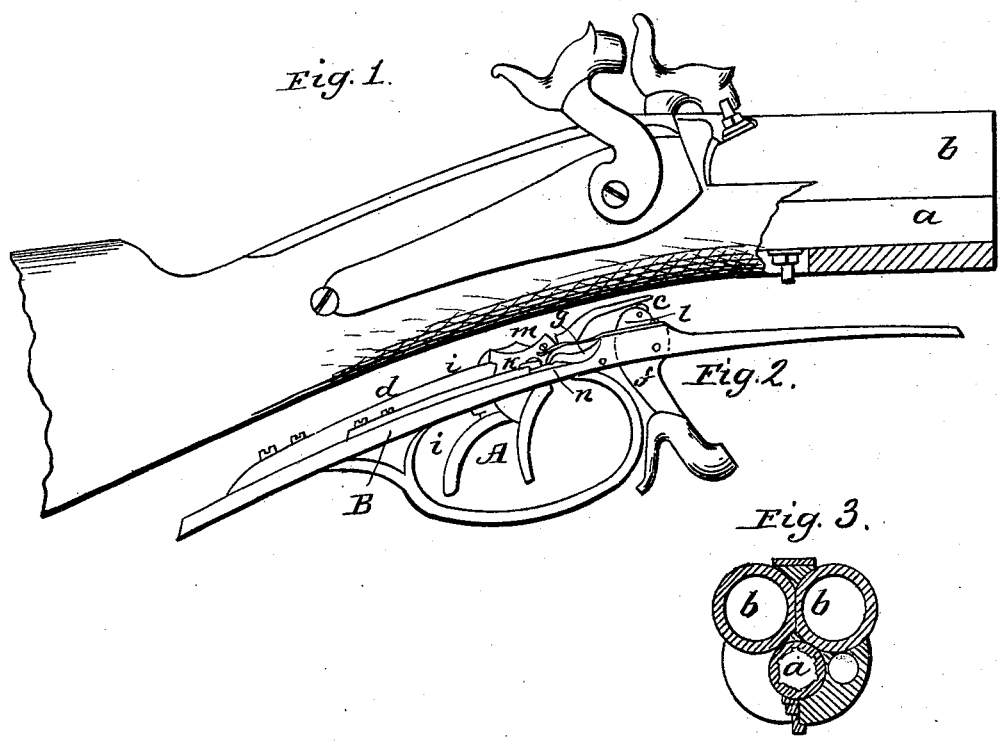
Witnesses:
Inventor: